3,230,053
APPARATUS FOR PRODUCING HIGH PURITY SILICON CARBIDE CRYSTALS

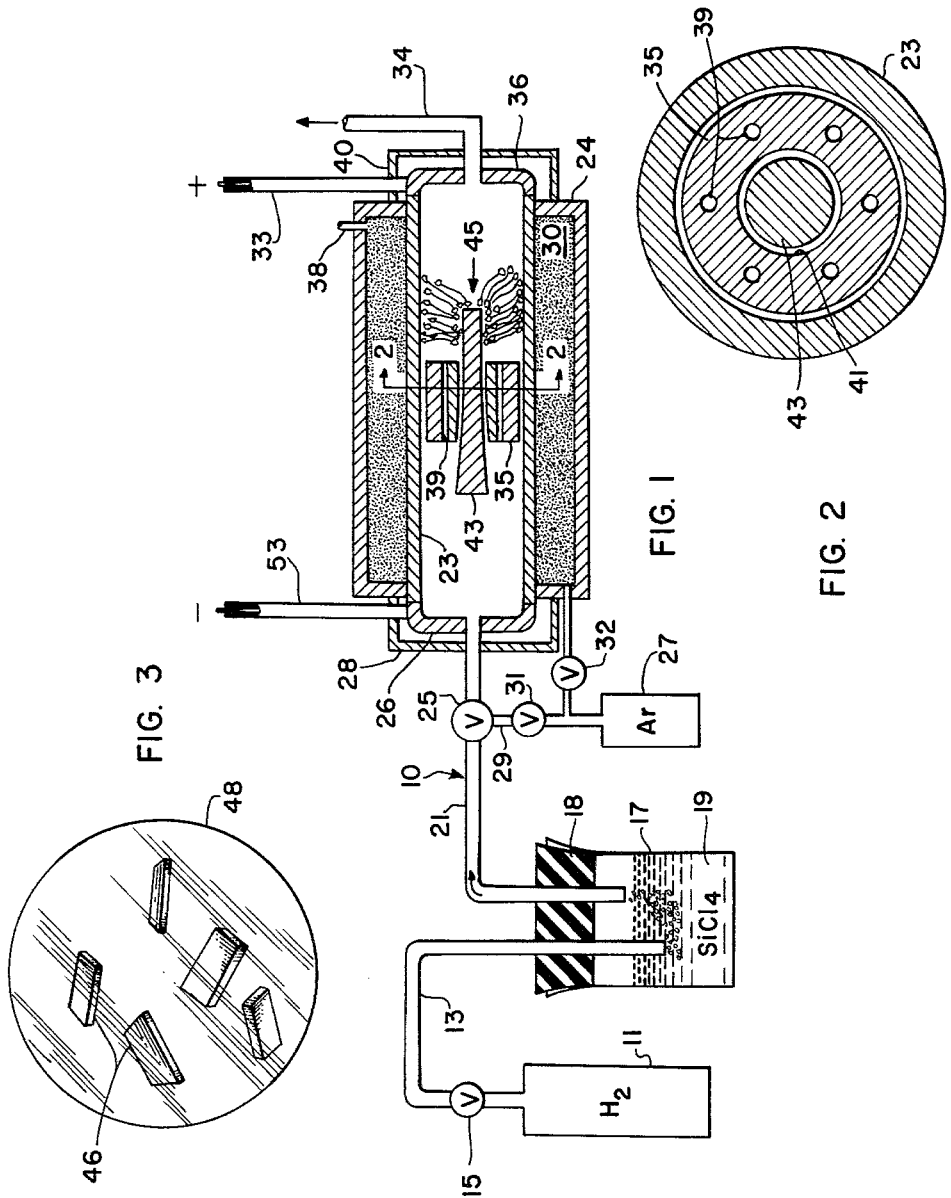

Noel T. Wakelyn and Robert A. Jewell, Hampton, Va., assignors to the United States of America as represented by the Administrator of the National Aeronautics and Space Administration
Original application Sept. 5, 1962, Ser. No. 221,637, now Patent No. 3,174,827. Divided and this application Sept. 25, 1963, Ser. No. 320,595
1 Claim. (Cl. 23—277)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial Number 221,637, filed September 5, 1962, now U.S. Patent Number 3,174,827.

This invention relates generally to the production of silicon carbide and relates with particularity to the production of small quantities of high purity silicon carbide on a carbon base, by the hydrogen reduction of silicon tetrachloride, with crystals being developed from the gaseous phase of the reactive materials.

Silicon carbide crystals are becoming of increasing importance in production of high temperature semiconductors useful in transistors and the like. Presently available transistors are usually made of germanium or silicon which are limited to maximum operating temperatures of approximately 70° and 150° C., respectively. Existing semiconductors employed in transistors are limited to these maximum operating temperatures since the energy required to raise an electron in these crystals to a state in which it conducts freely is only 0.7 electron volt for germanium and 1.1 electron volt for silicon. Since the electron gap of silicon carbide is more than twice that of silicon, silicon carbide crystals are desirable for use in manufacturing semiconductors useful at extreme temperatures such as those anticipated for instrumentation employed in space vehicles and other anticipated unusual, and extreme conditions. Also, since semiconductors of this type must be reliable and reproducible, it is desirable to manufacture them only from high purity crystals where controlled trace impurities may be added to perform the limited amount of conductivity needed. Thus, there is a definite need in the art for a process of economically producing high purity crystals of silicon carbide.

One heretofore process for producing silicon carbide deposits on a carbon base has been successfully accomplished by applying extreme heat to a carbon rod in an atmosphere of hydrogen gas and silicon tetrachloride; however, deposits obtained by this process require considerable time to produce and are of extremely low purity.

Another prior art process for obtaining silicon carbide crystals involves slow crystallization onto a seed crystal from a melt of silicon or a silicon alloy, contained in a graphite crucible. By this prior art process, the crucible contents are heated to a temperature sufficient to melt the silicon,- but short of the vaporizing temperature thereof, and a seed crystal of pure silicon carbide, securely attached to a suitable rod, is inserted into the molten mass and slowly and uniformly rotated and withdrawn a number of times. After a considerable length of time, for example forty-eight hours, single crystals of high purity silicon carbide crystals may be obtained on the seed and on the graphite crucible walls.

The present invention combines the advantageous features of both of the aforementioned prior art processes while minimizing the disadvantages thereof. Accordingly, an object of the present invention is the provision of a new and improved method of producing high purity silicon carbide.

Another object of the instant invention is the provision of an efficient, inexpensive, reliable, and rapid process for producing high purity silicon carbide crystals.

A further object of the present invention is to provide a method of producing high purity silicon carbide from the gaseous phase of the required reactant materials.

Another object of the present invention is the provision of novel apparatus for the production of high purity silicon carbide crystals.

According to the present invention, the foregoing and other objects are attained by providing apparatus whereby a hydrogen gas may be saturated with silicon tetrachloride and flowed under pressure through a constricted passageway within a high temperature furnace, onto a carbonaceous base or model member. The carbonaceous member employed in the present invention extends forward and aft of the constricted furnace area with silicon carbide crystal formation taking place in large quantity on the carbon model only on the portion thereof positioned aft of the constricted gaseous passageway.

A more complete appreciation of the invention and many of the attendant advantages thereof will be readily appreciated as the same becomes better understood by reference to the following detailed description when considered in connection with the accompanying drawings wherein:

FIG. 1 is a schematic, part sectional, view of the apparatus employed to produce high purity silicon carbide crystals according to the present invention;

FIG. 2 is a cross-sectional view of the apparatus shown in FIG. 1 taken along section lines 2—2 of FIG. 1; and FIG. 3 is a pictorial view of magnified single crystals of high purity silicon carbide produced according to the present invention.

Referring now to the drawings, wherein like reference numerals designate like or corresponding parts throughout the several views, and more particularly to FIG. 1, there is shown the apparatus, generally designated by reference numeral 10, employed in accordance with this invention. Apparatus 10 includes a pressurized cylinder 11 of hydrogen gas, having a tube 13 which leads therefrom through a suitable valve 15 and terminates in a container 17 of liquid silicon tetrachloride 19. Container 17 is closed by a suitable stopper 18 through which passes a conduit 21 terminating above the level of liquid 19. Conduit 21 connects the interior of container 17 with the interior of tubular furnace 23 through a conventional T-valve 25 and furnace end closure 26. Furnace 23 is provided with a protective casing 24 therearound adapted to receive a quantity of graphite powder 30 as will be further explained hereinafter. A tank 27 containing a pressurized inert gas, for example argon, is also connected to an inlet of T-valve 25 by way of duct 29 and "on-off" valve 31. Tank 27 also connects with the interior of protective casing 24 by way of valve 32.

Furnace 23 is of tubular construction, having the design of a conventional carbon tube furnace. It is resistantly heated, for example, by applying an electrical potential to end closure 26 and end stopple 36 by way of terminals 33 and 53 which lead from a suitable power source, not shown. Furnace 23 is vented to the atmosphere by way of tubulation vent 34 leading from the downstream end thereof through end stopple 36. Jackets 28 and 40 serving to circulate a suitable coolant therethrough, for example water, are connected to a suitable central coolant supply, not shown, and adapted to protect end closure 26 and stopple 36, respectively from the extreme heat present during operation of the apparatus. A centrally perforated model support 35 having a plurality of minute holes 39 (FIG. 2) formed therethrough, is loosely slideable within tubular furnace 23 to divide the furnace interior into an upstream region and a downstream region as well as to provide a plurality of constricted gaseous passageways therethrough and therearound. Holes 39 may be omitted in some instances with the only passageway for the saturated hydrogen gas flow being between the external surface of model support 35 and the interior of furnace 23. It is also apparent that suitable spacers, not shown, may be provided, either externally on model support 35 or internally of furnace 23, to provide specific area constricted passageways about support 35 within the scope of the present invention.

The central perforation 41 (FIG. 2) of model support 35 tapers over its length from the upstream furnace region toward the downstream furnace region and serves as the sole support for the tapered elongate carbon base or model member 43, slideably received thereby, with portions of model 43 extending from each end of model support 35 and spaced in its entirety from the interior of the furnace wall. The tapered configuration described herein is exemplary only and other suitable shapes may obviously be provided for carbonaceous base member 43 with any conventional support or retention means therefor within the scope of this invention.

*Operation*

In the operation of the apparatus described hereinabove, model 43 is positioned within model support 35 which is slideably received within tubular furnace 23. Furnace 23 is then enclosed by casing 24 which contains a volume of finely ground graphite powder 30 sufficient to completely engulf the furnace tube. End closure 26 and stopple 36 with water jackets 28 and 40 positioned thereon are then secured to furnace 23, by suitable clamps or threaded connections, not shown, and conduit 21 and tubulation vent 34 connected, respectively thereto. Water or other suitable coolant from the central supply, not shown, is then permitted to flow through jackets 28 and 40 and valve 32 is opened to allow inert gas, for example argon, to flow through the graphite powder 30 within protective casing 24; the gentle gas flow being vented to the atmosphere by way of tubular vent 38. This flow of inert gas "outgases" the graphite powder and permits powder 30 to remain in a fluffy condition to thereby completely protect the exterior of furnace tube 23 from oxidizing gases during the high temperatures employed during operation of apparatus 10. Valves 25 and 31 are also adjusted to allow inert gas from tank 27 to gently flow through furnace 23, and out tubulation vent 34, for a period of approximately ten minutes to purge the reaction chamber for removal of any impurities initially in the furnace which could adversely influence the formation of high purity silicon carbide crystals. Electric current is applied to closure 26 and stopple 36 for an interval sufficient to preheat furnace 23 and its contents, model support 35 and model 43, to a temperature of approximately 4,000° F. and maintained at this temperature level. Valve 15 from hydrogen cylinder 11 is then opened and valve 25 positioned to allow flow from container 17 while blocking the inert gas flow from tank 27. The system is calibrated to permit approximately 1.6 liters per minute of hydrogen gas to flow through tube 13 and bubble through the liquid silicon tetrachloride 19 in container 17. As the hydrogen gas bubbles through liquid 19, it becomes saturated with silicon tetrachloride and the saturated gas flows through conduit 21. The saturated gas, while flowing through furnace 23, passes through the constricted passageways 39, and the space between model support 35 and the interior of the furnace wall, onto that portion of graphite model 43 extending into the downstream region of furnace 23, with the excess gas flow being vented to the atmosphere through tubulation vent 34.

As the constricted gas flow passes over model 43, a chemical reaction takes place between the gaseous phase carbon and the silicon tetrachloride saturated hydrogen gas to form a plurality of silicon carbide crystals appearing as globules and strands 45 about the surface of model 43. The crystal formation appearance varies from pale yellow to yellow-green and pale green translucency. After approximately one hour of saturated gas flow through furnace 23, valve 15 is closed, T-valve 25 is rotated to open duct 29, and valve 31 is again opened to permit the flow of inert gas from tank 27 for approximately ten minutes to purge the system, during which time, the temperature of furnace 23 is raised and maintained at approximately 4,600° F. After purging, the electric current is shut off and the furnace permitted to cool to room temperature which requires approximately one hour. At the end of this cooling period valves 25, 31, and 32 are positioned to stop the flow of inert gas and crystal group 45 may then be removed with a multitude of single crystals 46 being physically separable from the group as shown under microscope lens 48 in FIG. 3. Crystals 46 are separable in the form of short thin platelets of several millimeters' length, strands of approximately fifty millimeters' length, and globules of several millimeters' length, and are suitable for use as rugged miniature semiconductors in commercial electronic instrumentation.

The pressure for the hydrogen gas flow from tank 11, and that for the inert gas from tank 27, are not considered critical and may be controlled by the respective valves 15, 31, and 32 such that the pressures thereof slightly exceed normal atmospheric pressure.

The material composition of model support 35 is also not considered critical, although when employing carbon or graphite as the material for support 35, as well as when using a carbon tube furnace, it would appear that the presence of excess carbon in the vapor phase would aid in the formation of silicon carbide crystals 45.

An example grade of carbon particularly suitable for constructing model 43 is "AGX" graphite rods commercially available from the National Carbon Company, a division of Union Carbide. The use of other commercial grades of carbon or graphite is also apparent to those skilled in the art and, obviously, within the scope of this invention.

It is significant to note that in the above described process, globules, and strands of silicon carbide crystals 45 are formed, in quantity, only on the portions of model 43 positioned aft of the restricted passageways formed by model support 35, with the remaining surface of model 43 being essentially coated with the light green form of silicon carbide. The formation of silicon carbide crystals is thus strictly a gaseous phase reaction and it is believed that as the reactants pass from the center or hottest part of the furnace into a slightly cooler region that gaseous silicon carbide more readily deposits out in solid form, although applicants do not intend to be limited to this theory of operation.

Obviously, many modifications and variations of the present invention are possible in the light of the above teachings. For example, furnace 23 need not be the carbon tube type described and may be heated other than by the described resistance heating system, such for example induction heating apparatus, when so desired. It is therefore to be understood that within the scope of the appended claim, the invention may be practiced otherwise than as specifically described.

What is claimed and desired to be secured by Letters Patent of the United States is:

An apparatus for producing recoverable high purity silicon carbide crystals on a carbon base in the presence of hydrogen gas saturated with silicon tetrachloride comprising:

an elongate electrically heated furnace, a model support slidably positioned within said furnace loosely adjacent to the internal surface thereof so as to form a constricted passageway between said support member and said furnace wall, said model support dividing said elongate furnace into an upstream region and a downstream region and being provided with a substantially central perforation tapering in diameter from said upstream furnace region to said downstream furnace region, said support member slidably receiving an elongated tapered graphite rod within said central perforation with end portions of said rod extending from opposite sides of said support into said upstream and said downstream furnace regions, and means to effect flow of said hydrogen gas and its contained silicon tetrachloride into the upstream region of said furnace through said constricted passageway and onto said graphite rod portion within said downstream region of said furnace.

References Cited by the Examiner
UNITED STATES PATENTS 2,602,033 7/1952 Lander.
2,677,627 5/1954 Montgomery et al.

MORRIS O. WOLK, *Primary Examiner.*

JAMES H. TAYMAN, *Assistant Examiner.*